United States Patent
Kirschey

(10) Patent No.: US 9,506,502 B2
(45) Date of Patent: Nov. 29, 2016

(54) ELASTIC SHAFT COUPLING

(71) Applicant: Centa-Antriebe Kirschey GmbH, Haan (DE)

(72) Inventor: Gerhard Kirschey, Wuppertal (DE)

(73) Assignee: CENTA-ANTRIEBE KIRSCHEY GMBH, Haan (DE)

( * ) Notice: Subject to any disclaimer, the term of this patent is extended or adjusted under 35 U.S.C. 154(b) by 0 days.

(21) Appl. No.: 14/140,133

(22) Filed: Dec. 24, 2013

(65) Prior Publication Data
US 2014/0274422 A1 Sep. 18, 2014

(30) Foreign Application Priority Data

Mar. 18, 2013 (DE) ............... 10 2013 004 583

(51) Int. Cl.
*F16D 3/68* (2006.01)
(52) U.S. Cl.
CPC ..................... *F16D 3/68* (2013.01)
(58) Field of Classification Search
CPC ............. F16D 3/64; F16D 3/68; F16D 3/74
USPC .................. 464/73–76, 87, 89, 158, 159
See application file for complete search history.

(56) References Cited

U.S. PATENT DOCUMENTS

| | | | | |
|---|---|---|---|---|
| 2,301,659 A * | 11/1942 | Ricefield | ......... | 464/73 |
| 2,873,590 A * | 2/1959 | Croset | ......... | 464/74 |
| 3,638,454 A * | 2/1972 | Croset | ......... | 464/76 |
| 3,675,750 A * | 7/1972 | Wright | ......... | 464/74 |
| 3,837,179 A * | 9/1974 | Barth | ......... | 464/76 |
| 4,424,046 A * | 1/1984 | Ziegler | ......... | 464/74 |
| 4,437,847 A * | 3/1984 | Calistrat | ......... | 464/74 |

FOREIGN PATENT DOCUMENTS

| | | |
|---|---|---|
| BE | 553 482 A | 1/1957 |
| CN | 86107642 A | 6/1987 |

(Continued)

OTHER PUBLICATIONS

"Trapezes." Dictionary.com. [online], [retrieved on Feb. 9, 2014]. Retrieved from the Internet <URL: http://dictionary.reference.com/browse/trapezes>.*

*Primary Examiner* — Josh Skroupa
(74) *Attorney, Agent, or Firm* — Von Rohrscheidt Patents

(57) ABSTRACT

An elastic shaft coupling including a first circular cylindrical shaft hub including first claws distributed over an outer circumference of the first shaft hub and offset from one another; and a second circular cylindrical shaft hub including second claws distributed over an outer circumference of the second shaft hub and offset from one another, wherein the first claws and the second claws engage one another through protruding into respective intermediary spaces, wherein an elastic coupling element is respectively arranged between adjacent first claws and second claws, wherein at least an outer circular cylindrical circumferential surface of a shaft hub is provided with mounting surfaces for the claws, wherein the outer circumferential surface is configured in a portion of the mounting surfaces so that it differs from the circular cylindrical contour and the claws supported by the hub contact the hub side mounting surfaces in a form locking manner.

5 Claims, 12 Drawing Sheets

(56) References Cited

FOREIGN PATENT DOCUMENTS

| CN | 102741577 | A | 10/2012 |
| DE | 2211512 | A | 10/1973 |
| DE | 31 13 813 | A1 | 1/1982 |
| DE | 298 06 632 | U1 | 10/1998 |
| DE | 202004003933 | U1 | 5/2004 |
| DE | 20201110600 | U1 | 5/2012 |
| DE | 202011105999 | | 7/2012 |
| EP | 133944 | * | 3/1985 ............... F16D 3/68 |
| EP | 0937902 | A2 | 8/1999 |
| FR | 2 327 442 | | 6/1977 |
| WO | WO2011088860 | A1 | 7/2011 |

* cited by examiner

ELASTIC SHAFT COUPLING

RELATED APPLICATIONS

This application claims priority from and incorporates by reference German patent application number DE 10 2013 004 583.5 filed on Mar. 18, 2013.

FIELD OF THE INVENTION

The invention relates to an elastic shaft coupling with a first circular cylindrical shaft hub which supports first claws that are distributed over its outer circumference and offset from one another and a second circular cylindrical shaft hub which includes second claws distributed over its outer circumference and offset from one another, wherein the first and the second claws engage one another through protruding into respective intermediary spaces and wherein an elastic coupling element is respectively arranged between adjacent claws.

BACKGROUND OF THE INVENTION

Couplings of this general type are designated as claw couplings. A coupling of this general type is described in DE 22 11 512 A. Therein, the claws are integral elements of the shaft hubs. They protrude from the shaft hub in axial direction. The elastic coupling elements which are arranged between two respectively adjacent claws are cylindrical or roller shaped and arranged at one another through an elastomeric ring.

Claw couplings of this type have been improved in various ways. Thus, DE 29 80 6632 U1 discloses a solution to join elastomeric rings with elastic coupling elements for claw couplings in and advantageous manner from individual components. The applicant sells claw couplings under the trade name Centaflex B, wherein the claws are radially attached at the hubs and facilitate easy radial replacement. There is a friction locking connection between an outer circumference of the hub and claw surfaces oriented towards the hub. Also in this coupling, the elastomeric elements that are arranged between the claws are connected with one another through a ring element.

Claw couplings with claws that can be dismounted in a radial direction have been proven in many applications. On the one hand, it is typically not required to move the units apart in axial direction for assembling or disassembling the coupling. Furthermore, individual claws can be replaced as required. The material and the connection allowing, the elastic coupling elements can also be mounted by disconnecting the ring without moving units apart in axial direction.

However, it has become apparent that there is potential for improvement with respect to replacing wear components, in particular when replacing the elastic coupling elements and also when producing claw couplings of this general type. Thus, the elastic coupling elements can only be replaced in their entirety since they are integrally connected in one piece. The radially removable claws have to be individually made for each hub diameter due to the differing hub circumferences and for specific torques.

BRIEF SUMMARY OF THE INVENTION

Thus, it is an object of the invention to overcome these disadvantages with respect to manufacturing complexity and replacing worn parts.

The object is achieved by an elastic shaft coupling including a first shaft hub which includes first claws that are distributed over an outer circumference of the first shaft hub and offset from one another; and a second shaft hub which includes second claws that are distributed over an outer circumference of the second shaft hub and offset from one another, wherein the first claws and the second claws engage one another through protruding into intermediary spaces respectively arranged between the first claws and the second claws, wherein elastic coupling elements are respectively arranged between adjacent first claws and second claws, wherein an outer circumferential surface of at least one of the first shaft hub and the second shaft hub is provided with mounting surfaces for the first claws or the second claws respectively, wherein the first claws or the second claws supported by the at least one of the first shaft hub and the second shaft hub are arranged on the mounting surfaces of the at least one of the first shaft hub and the second shaft hub in a form-locking manner.

It is an essential advantage of the invention to machine an outer circumferential surface of the shaft hub and provide it with mounting surfaces for receiving the claws. The mounting surfaces for the claws are identical for various hub sizes, so that the same claws can be used for hubs with different diameters. This substantially reduces production complexity since accordingly adapted claws do not have to be kept in stock for each hub diameter. In so far any hub circumference which corresponds to a multiple of a claw width in circumferential direction can be configured with identical claws. In practical applications, this means that claw couplings with different performance ratings are producible using identical claws that are only varied with respect to their numbers and their pitch circle. Thus eventually, claw couplings for transferring small torques have the same claws as couplings for transferring large torques. The couplings only differ through the number of the claws and the hub diameter adapted to the pitch circle of the claws.

Thus, a plurality of different coupling sizes can be produced from few standardized components in a simple manner. This simplifies production and inventory management significantly.

Typically, the hubs are circular cylindrical, so that an outer circumferential contour in the portion of the mounting surfaces is configured different from the circular cylindrical circumferential geometry.

It is provided in particular that the mounting surface is configured planar. Thus, it is preferably provided that the mounting surface includes a groove or is formed by a groove.

Forming a planar mounting surface with a groove or forming a groove shaped mounting surface provides optimum conditions to support the claws in a form-locking manner.

In order to provide ideal support of the claws on the hub and in order to optimize the torque loading of the connection between the claw and the hub, it is provided that the claws have contact surfaces which are formed in a complementary manner to the hub side mounting surfaces.

An advantageous embodiment is characterized in that the first claws include shell shaped support recesses that are arranged as a mirror image to an axial plane of the shaft coupling wherein the shell shaped support recesses support elastic coupling elements in radial and/or axial direction which coupling elements are not connected with one another.

This configuration is a prerequisite that the wearing elastic coupling elements are individually replaceable. This is performed in an optimum manner in that the supporting claw is removed in a radial direction so that the elastic coupling elements supported by the claw are accessible for replacement.

It is furthermore provided that the second claws configure a shape adapted seat for the elastic coupling elements, in particular when the second claws support the elastic coupling elements in circumferential direction in the support recesses of the first coupling elements.

This embodiment is characterized in that the second claws with exception of the support of the elastic coupling elements in circumferential direction have no additional support function. The support function in circumferential direction is intrinsic to the system since only this way supporting the first and second claws at one another is provided through the elastic coupling elements. In summary, this means that a radial and axial support of the elastic coupling elements that are not connected with one another is exclusively provided through the first claws.

When care is taken that the radial opening angle of the second claws facilitates a radial extraction of the first claws including the elastic coupling elements supported by the first claws, only the first claws have to be radially removed in order to replace the elastic coupling elements.

Thus, it is provided in one embodiment that the first claws essentially form symmetrical trapezoids in a radial sectional view and the second claws are essentially configured as bars and have their geometric origins in the rotation axis of the shaft coupling.

BRIEF DESCRIPTION OF THE DRAWINGS

Additional advantages of the invention and a better understanding of the invention can be derived from the subsequent description of an embodiment with reference to drawing Figures, wherein.

DETAILED DESCRIPTION OF THE INVENTION

Figure 1:
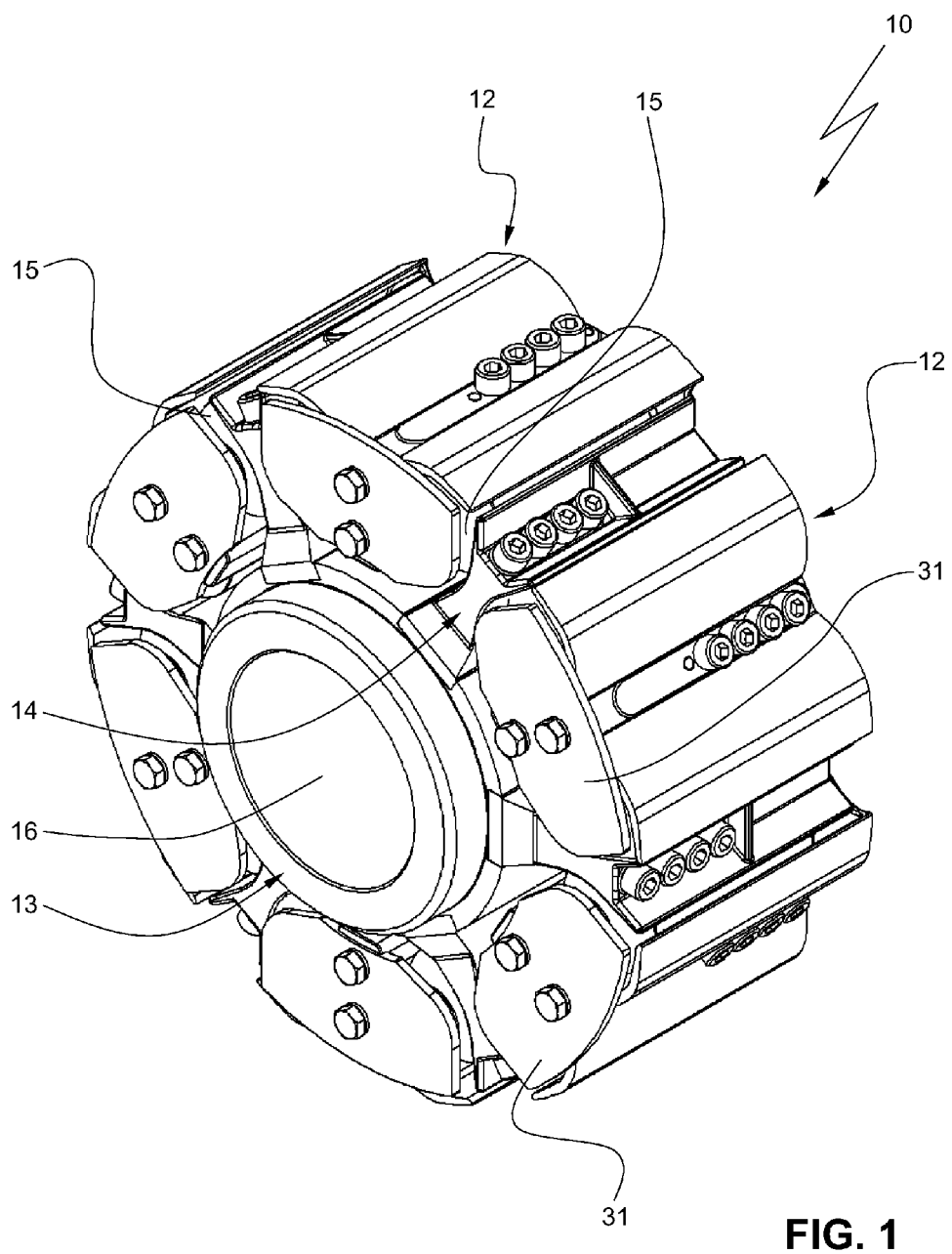
FIG. 1. illustrates an overall view of a shaft coupling according to the invention.

In the figures, a shaft coupling according to the invention is provided overall with the reference numeral 10.

The shaft coupling includes a first hub 11 with first claws 12 and then a second hub 13 with second claws 14. The first claws 12 are arranged on the outer circumference of the first hub 11 and are thus arranged distributed in even intervals over the outer circumference. Thus, the second claws 14 are also arranged on an outer circumference of the second hub 13 and, in turn, arranged evenly distributed over its outer circumference.

In FIG. 1, the first claws 12 and the second claws 14 engage one another, thus a first claw 12 is respectively arranged in an intermediary space between two adjacent second claws 14. Each second claw 14 is arranged in an intermediary space between two adjacent first claws 12. Between the respectively adjacent claws 12, 14, an elastic coupling element 15 is arranged so that each first claw 12 is supported at the respective second claw 14 that is proximal in rotation direction of the shaft coupling 10, wherein the support is provided through the intermediary elastic coupling element 15.

Figure 6:
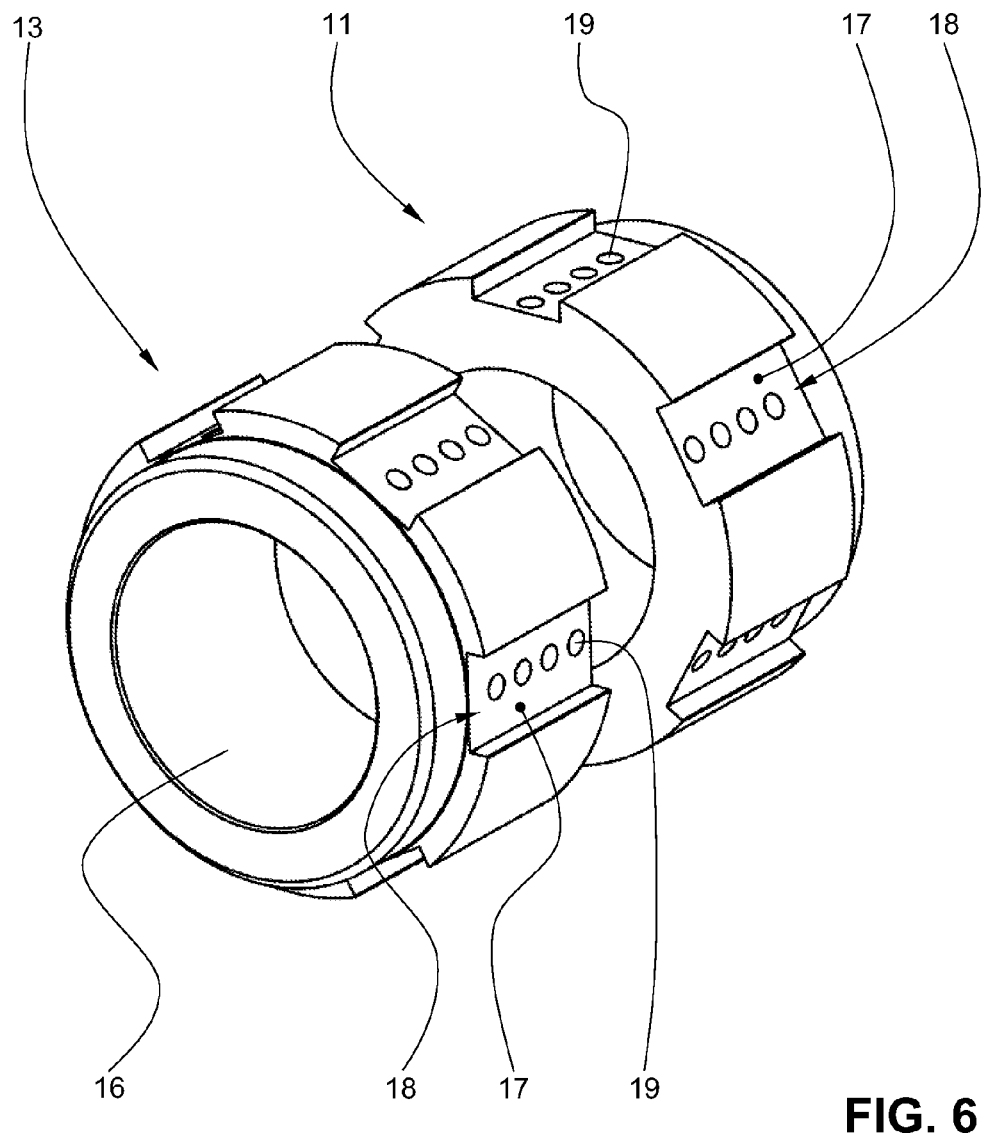
FIG. 6 illustrates the arrangement of the first hub and the second hub of the shaft coupling according to FIG. 1 in a perspective view.

FIG. 6 illustrates the first hub 11 and the second hub 13 in a perspective view without optional additional components. The respective central recess 16 of the hubs 11, 13—the hub bore is used for a fixated arrangement of the hub on a respective shaft. Both hubs 11, 13 have an essentially circular cylindrical outer contour, which is interrupted by mounting surfaces 17. In the present embodiment of FIG. 6., these are grooves 18 introduced into the outer circumference which grooves have a flat base surface and two side walls that are configured perpendicular to the base surface. In the portion of the grooves 18, threaded bore holes 19 are arranged which are used for attaching the first or the second claws 12, 14.

Both hubs 11, 13 are essentially identical in the embodiment. However, they are arranged as mirror images with respect to a radial plane. With respect to the mounting surfaces, they are arranged circumferentially offset relative to one another.

Figure 9:
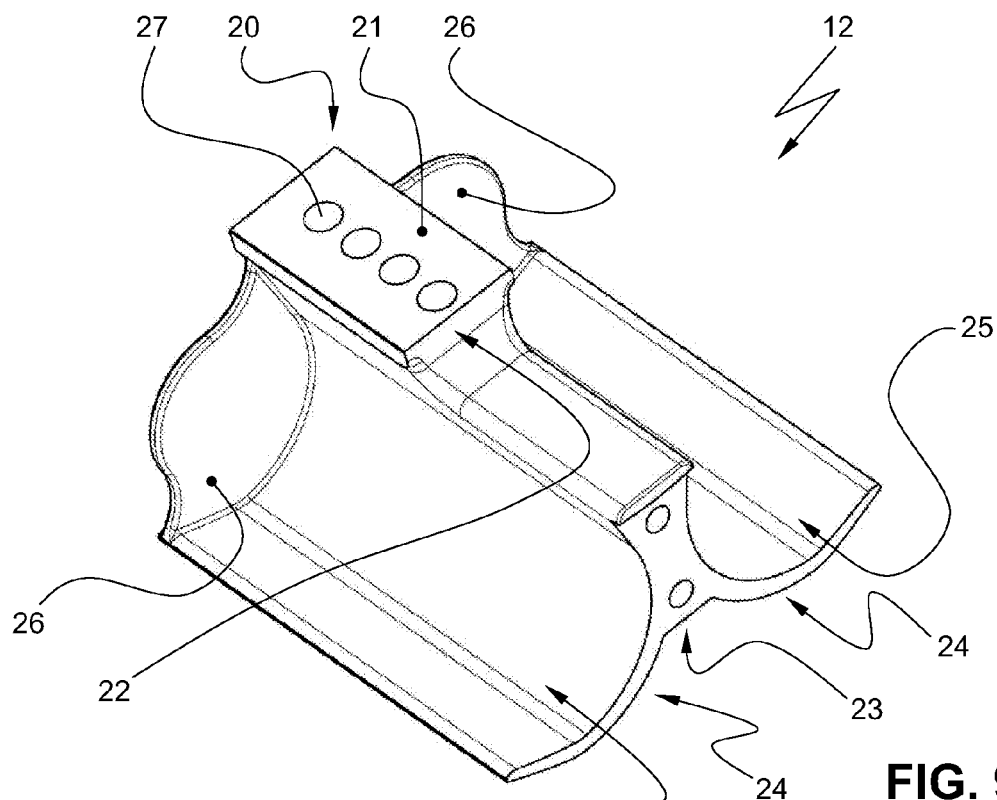
FIG. 9 illustrates a first claw in a view from below.

FIG. 9 illustrates a first claw 12 in a perspective view from below. It can be initially derived from FIG. 9 that the first claw 12 has a base 20 which forms a contact surface 21 at its bottom side, this means oriented toward the first hub 11. The contact surface 21 corresponds with respect to its dimensions to the hub side mounting surface 17. Since the hubs 11, 13 form an assembly groove 18 in the instant embodiment, the claw side contact surface 21 is part of a base pedestal 22 that is shaped complimentary to the groove 18 and closes the base in downward direction. When mounting the first claw 12 in the mounting groove 18 of the first hub 11, the base pedestal 22 is completely arranged in the groove 18. This is apparent in particular from FIG. 7 which illustrates the first hub 11 with mounted first claws 12 in a perspective overall view.

In radial direction in FIG. 9 into the paper plane 22, a central support element 23 extends from the base pedestal 22, wherein the central support element furthermore also protrudes in axial direction relative to the base pedestal 22.

Two support wings 24 extend from the support element 23. On of the support wings 24 extends in circumferential direction counterclockwise; the second support wing extends clockwise. Together with the support element 23, the support wings 24 respectively form essentially a shell shaped support recess 25 which is, at least at one of its axial ends, provided with an axial terminal wall 26 arranged in a radial plane.

Support bore holes 27 are arranged in the portion of the base which extend radially through the support element 23, wherein the support bore holes are aligned with the threaded bore holes 19 of the first hub 11 with respect to their number and orientation. It is apparent from a joint view of FIGS. 7 and 9 that the first claw 12, in particular its support recesses 25, are configured mirror symmetrical to an axial plane that includes the rotation axis.

Figure 8:
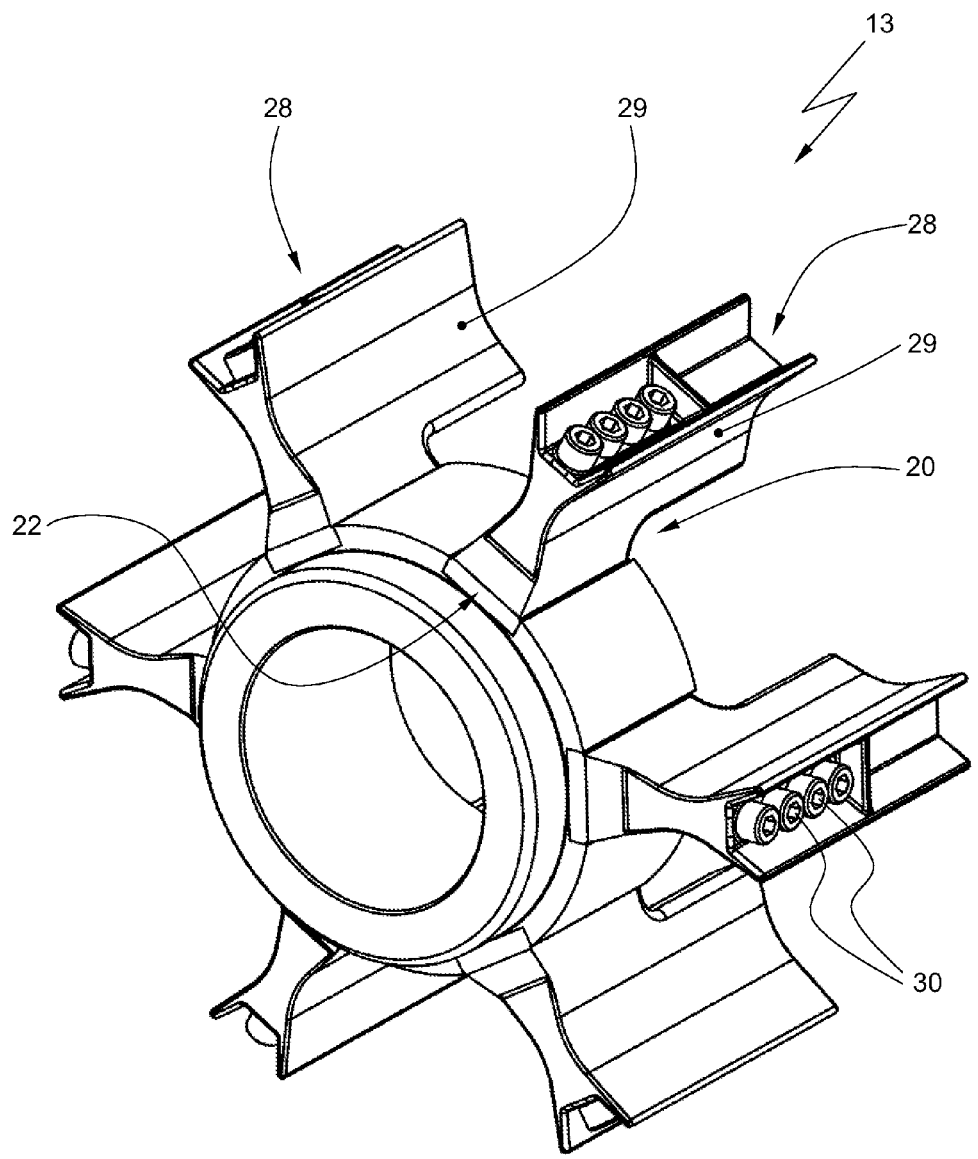
FIG. 8 illustrates the second hub with the second claws in a perspective view.
Figure 10:
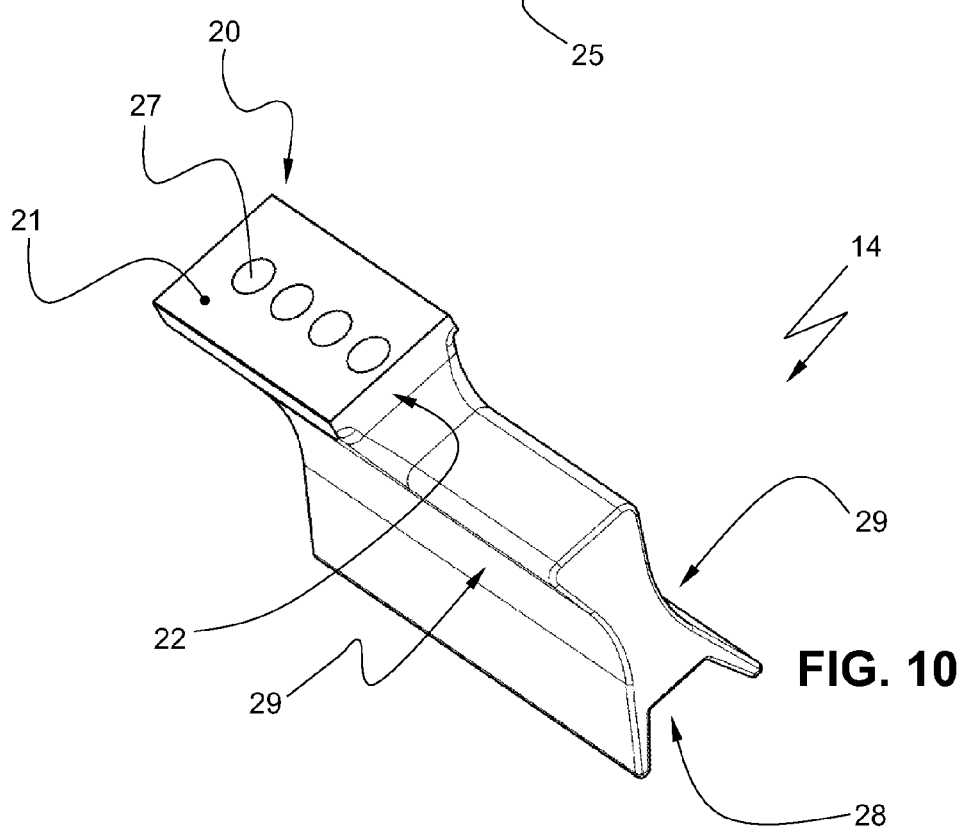
FIG. 10 illustrates a second claw in a view from below.

FIG. 10 illustrates a second claw 14 in a perspective view from below. FIG. 8 illustrates the associated second hub 13 with the second claws 14 mounted evenly distributed over the circumference.

Like the first claw 12, the second claw 14 also includes a base 20 whose bottom side that is oriented towards the hub forms a contact surface 21. Since also the second hub 13 has mounting grooves 18, the contact surface 21 is part of a groove complimentary base pedestal 22.

A claw body 28 extending in radial direction from the base pedestal 22 in FIG. 10 into the paper plane protrudes in axial direction relative to the base pedestal 22.

Also the second claw 14 is penetrated by radial support bore holes 27 in the portion of the base pedestal 22, wherein the support bore holes are aligned with respect to number and orientation with the threaded bore holes 19 in the mounting groove 18 of the first hub 13. The side surfaces 29 of the second claw 14 oriented in circumferential direction are recessed concave and thus form a respective seat for the cylindrical or roller shaped elastic claw elements 15.

Figure 7:
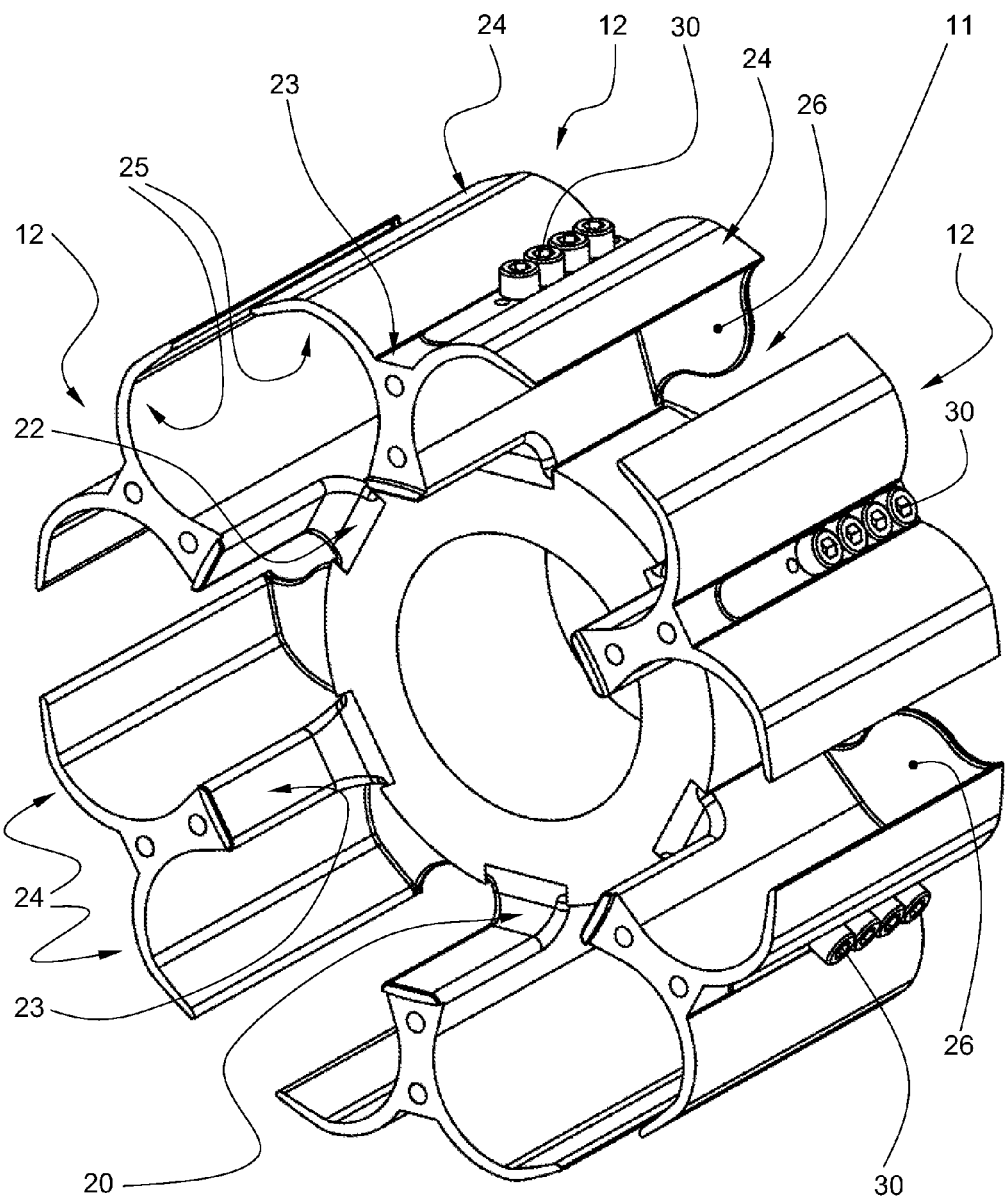
FIG. 7 illustrates the first hub with the first claws in a perspective view.

FIGS. 7 and 8 illustrate that plural first or second claws 12, 14 are respectively arranged in even increments on the respective first or second hub 11, 13. Between the first or second claws 12, 14, intermediary cavities are formed. Thus, the intermediary cavities between the first claws 12 are sized so that the second claws 14 can be arranged therein. By the same token, the first claws 12 can be arranged in the intermediary cavities between the second claws 14. As apparent from FIGS. 7 and 8, the first claws and also the second claws 12, 14 are arranged through threaded bolts 30 on the respective hub 11, 13. The threaded bolts reach for this purpose through the support bore holes 27 of the claws 12, 14 and are threaded into the threaded bore holes of the hubs 11, 13.

Figure 2:
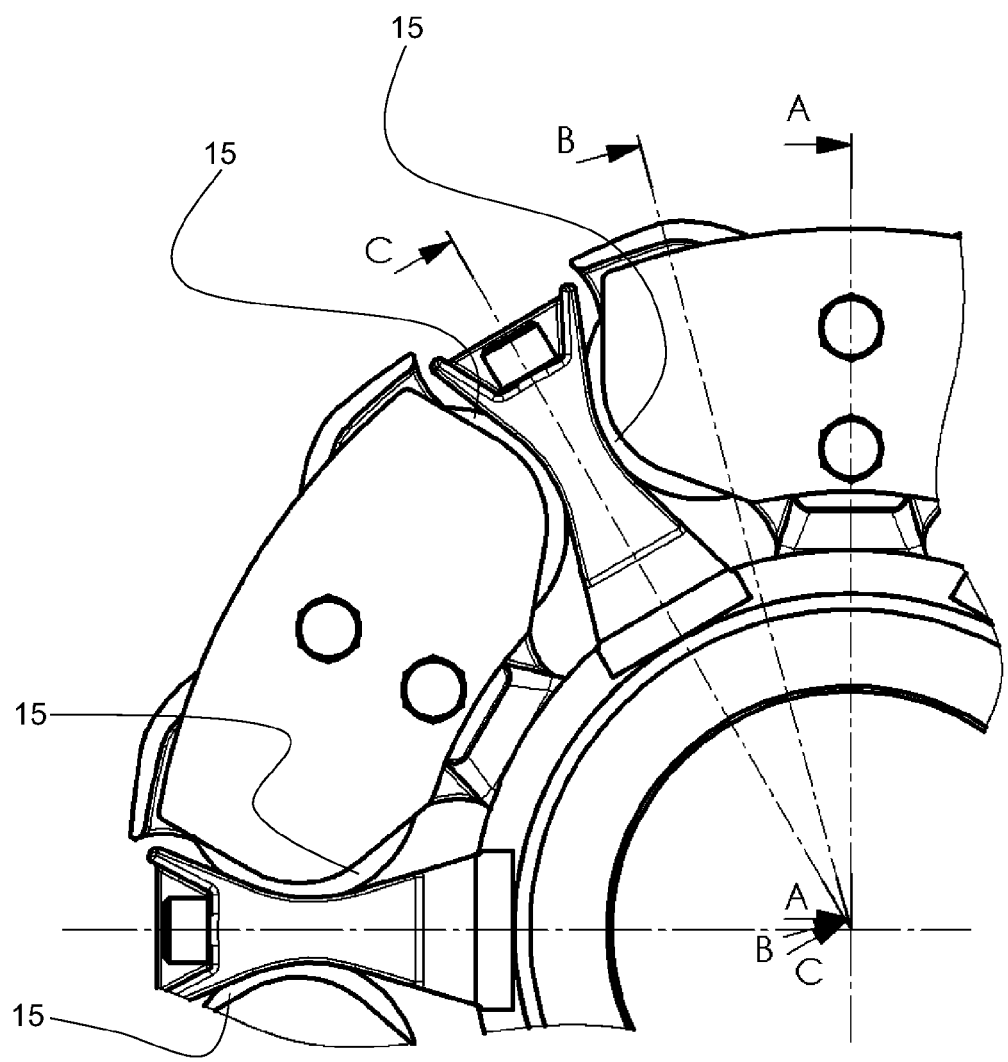
FIG. 2 illustrates an axial partial view of the shaft coupling according to FIG. 1.
Figure 3:
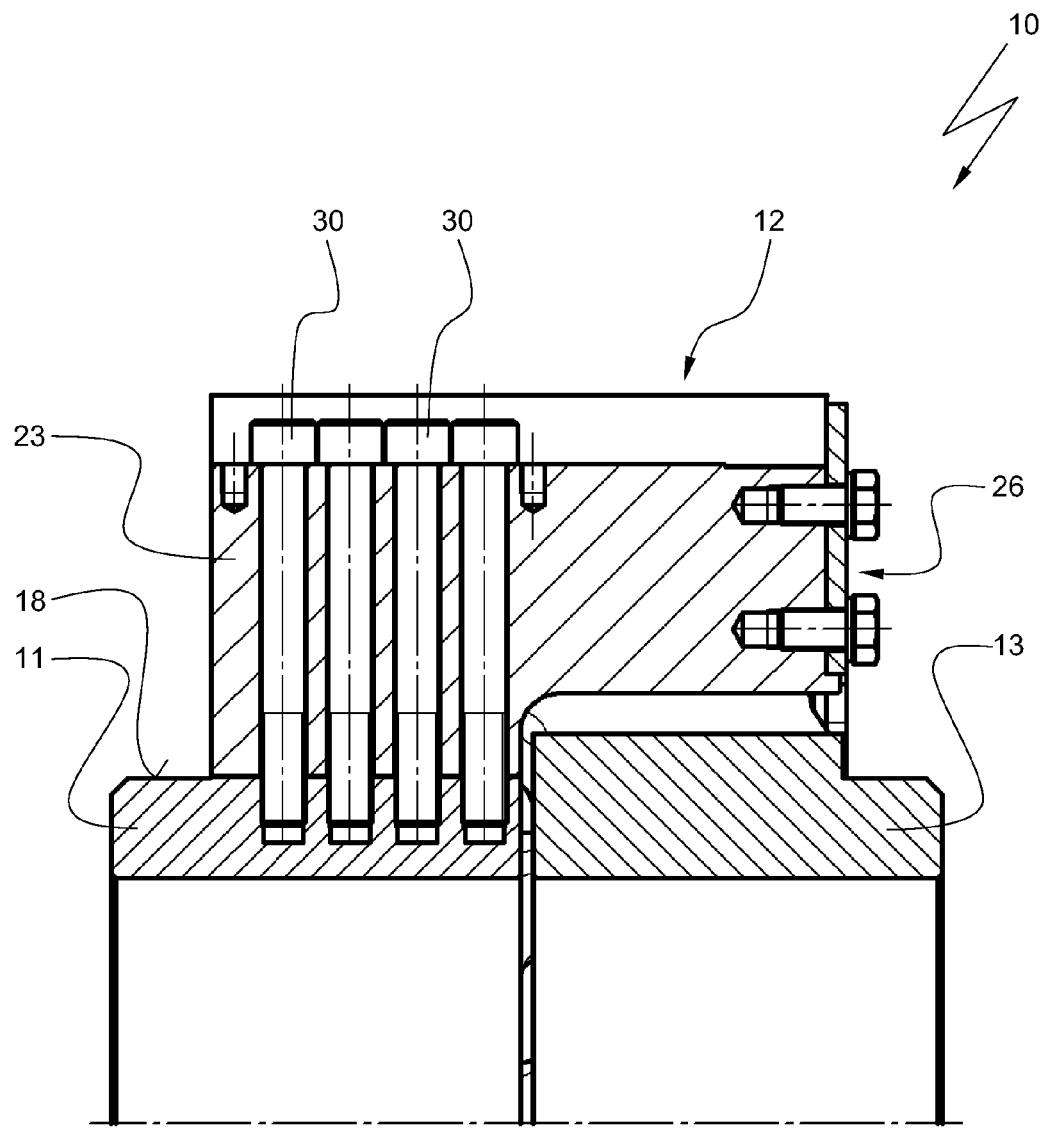
FIG. 3 illustrates an axial sectional view according to the sectional line A-A in FIG. 2 through a first claw of the shaft coupling according to FIG. 1.
Figure 4:
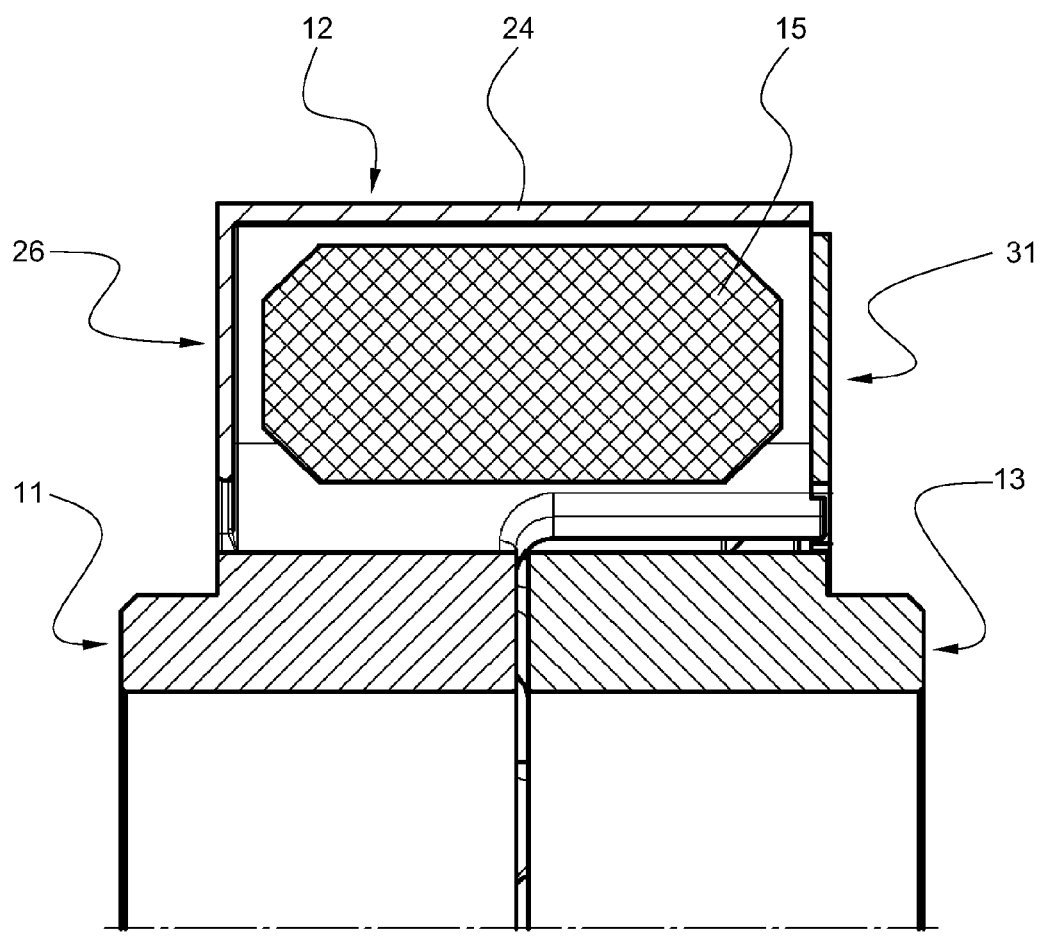
FIG. 4 illustrates an axial sectional view according to the sectional line B-B in FIG. 2 through the elastic coupling element contacting the first claw in the shaft coupling according to FIG. 1.
Figure 5:
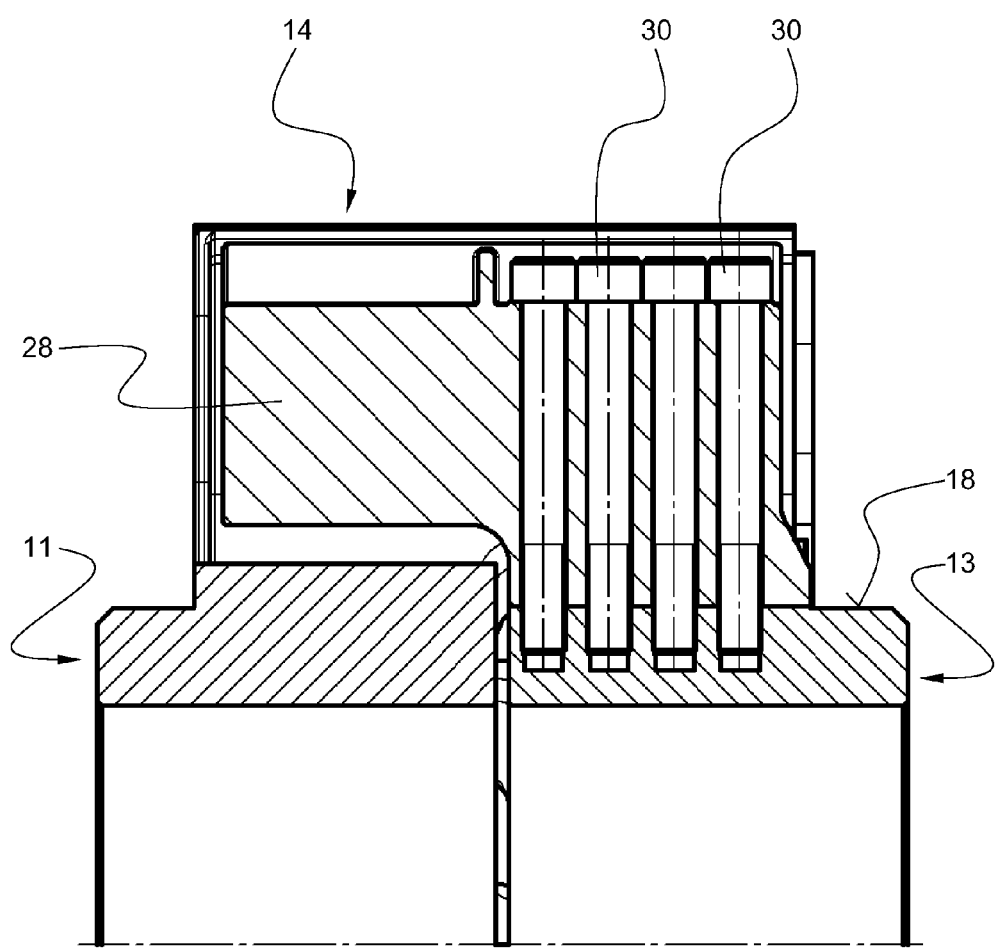
FIG. 5 illustrates an axial sectional view according to the sectional line C-C in FIG. 2 through a second claw of the shaft coupling according to FIG. 1.

These facts are apparent from FIGS. 3 and 5. FIG. 3 is an axial sectional view through the sectional plane A-A in FIG. 2, thus through the first claw 12. It can be furthermore derived from FIG. 3 that the portion of the support element 23, axially protruding relative to the base 20 penetrates the radial space of the second hub 13 with its support wings 24.

FIG. 5 also illustrates an axial sectional view, herein however, according to the sectional plane C-C in FIG. 2. This is an axial sectional view through the second claw 14. Besides the attachment of the second claw 14 at the second hub 13 through the radially inserted threaded bolts 30, it is evident that the axial portion of the claw element 28 that protrudes relative to the base pedestal 22 protrudes into the radial space of the first hub 11.

Figure 11:
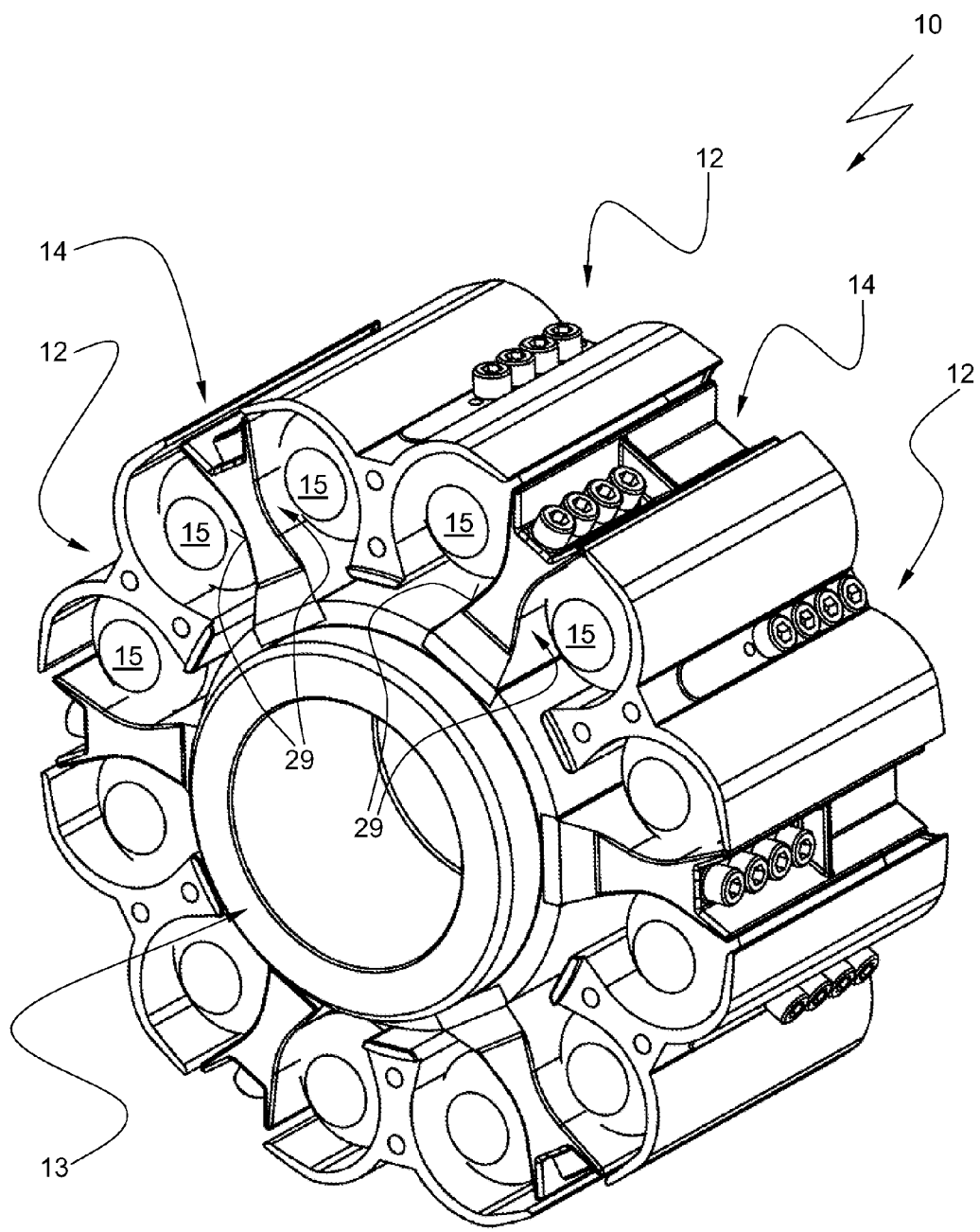
FIG. 11 illustrates a perspective overall view of the shaft coupling according to FIG. 1 in a perspective view.

The mutual penetration of the first claw 12 and the second claw 14 into the radial spaces of the second hub 13 and the first hub 11 leads to the assembled situation illustrated in FIG. 2 or FIG. 11 in which the first claws 12 are arranged in the intermediary spaces of the second claws 14 and the second claws 14 are arranged in the intermediary cavities of the first claws 12.

For damping purposes, cylindrical or ruler shaped elastic coupling elements 15 are arranged between the adjacent first and second claws 12, 14. These coupling elements are supported against axial and radial movement exclusively by the first claws 12, wherein the elastic coupling elements 15 are arranged in the support recess 25 of the first claws 12. The side surfaces 29 of the first claws 14, forming a seat through their concave arrangement, support the elastic coupling elements 15 in circumferential direction in the support recesses 25 of the first coupling elements 15. The concave shape of the side surfaces 29 facilitates an area contact of the elastic coupling elements 15 instead of a line-shaped contact at concave side surfaces 29. This leads to a more gentle treatment of the elastic coupling elements 15.

Figure 12:
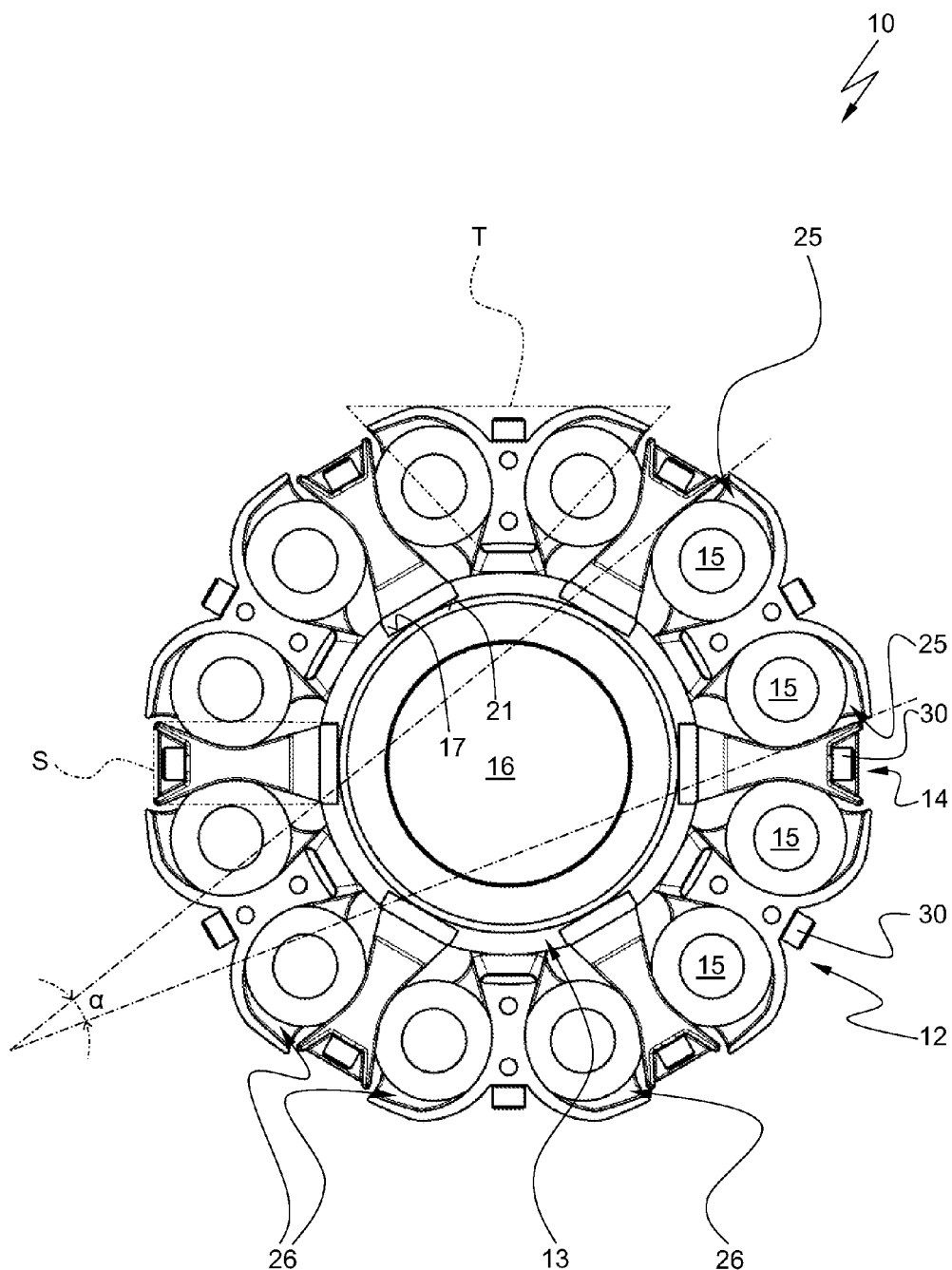
FIG. 12 illustrates an axial view of the second hub of the shaft coupling according to FIG. 11.
Figure 13:
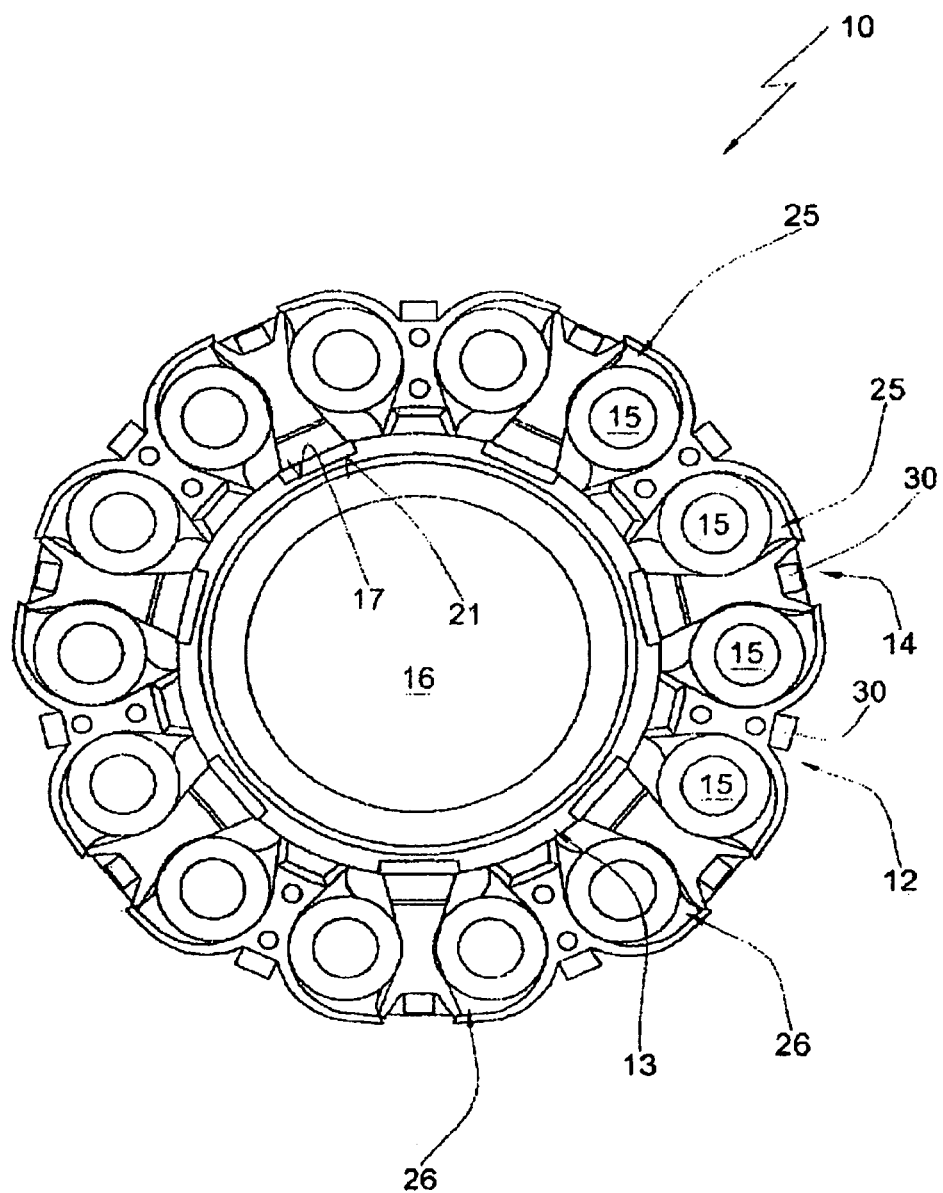
FIG. 13 illustrates an axial view of the second hub of the shaft coupling including seven sets of claws.

FIG. 12 illustrates an axial view of the second hub 13 of the shaft coupling 10 in FIG. 11. Besides the radial attachment of the first and second claws 12, 14 through threaded bolts 30, this illustration clearly shows the arrangement of the elastic coupling elements 15 in the support recess 25 of the first coupling elements 12. It is furthermore visible that the support wings 24 support the coupling elements 15 in radial direction. The terminal walls 26 provide axial securing in axial direction. Only the terminal walls 26 are illustrated that are in the back in viewing direction. The front walls 31 that are arranged in front in assembled condition and cover the axial view of the coupling elements 15 are omitted.

As evident in particular from FIG. 1, the front walls 31 are bolted to the first claws 12 in a disengageable manner. Each first claw 12 has a front wall 31 that closes its support recesses 25 in axial direction. This advantageously facilitates extracting the first claws 12 individually in radial direction or presuming respective accessibility, facilitates axially extracting individual coupling elements 15.

Alternatively, instead of individual front walls 31, the support recesses 25 of the first claws 12 can also be covered by an annular disc and can be closed in axial direction. Also this non-illustrated annular disc is attached with threaded bolts at the first claws 12. The essential advantage of the annular disc is connecting the first claws 12 with one another. This connection stabilizes the first claws 12 against impacting centrifugal forces and unloads the threaded bolts 30 that are used for radial attachment. After disengaging the threaded connection, radially extracting the first claws 12 is still possible.

The circumferential contours in the radial plane of the shaft coupling 10 are essentially formed as a symmetrical trapezoid for the first coupling elements 12. This is emphasized by the circumferential line T drawn in FIG. 12. On the other hand, the second claws 14 in the radial plane, thus in the instant face view of the second claw 14, have an essentially rectangular or bar shaped circumferential contour. This is symbolized by the circumferential line S in FIG. 12.

It is also evident from FIG. 12 that the second claws 14 do not have any radial support function for the elastic coupling elements 15. Furthermore FIG. 12 shows that the opening angle α of two adjacent second claws 14 provides radial extraction of the first claw 12, arranged there between and thus radial replacement of the first elastic coupling elements 15. The opening angle α is also illustrated in FIG. 12 for this embodiment. In the instant embodiment of the second claws 14 with their side walls that are recessed concave, form a seat and are oriented in circumferential direction, the opening angle α has to be determined that is enclosed between the wall sections which are arranged on a radial outside with respect to the apex point of the concave recess. These wall sections have to be oriented parallel with one another so that the opening angle α=0 degrees or enclose a positive opening angle and consequently form a funnel shaped opening viewed from the rotation axis.

In as far as radial extraction of individual coupling elements 15 or individual claws 12, 14 is not required, claws 12, 14 with different shapes or identical shapes can be used which is well known in the art.

To sum it all up, a shaft coupling 10 is disclosed which facilitates arranging standardized claws 12, 14 regardless of hub diameter due to identical mounting surfaces 17.

Additionally, it was demonstrated through the alternating arrangement of bar-shaped or trapezoid claw elements and the support function of the trapezoid claws for unconnected coupling elements 15 that radial replacement of coupling elements 15 is facilitated.

REFERENCE NUMERALS AND DESIGNATIONS

10 Shaft coupling
11 First hub
12 First claw
13 Second hub
14 Second claw
15 Elastic coupling element
16 Central recess
17 Mounting surface
18 Groove
19 Threaded bore hole
20 Base
21 Contact surface
22 Base pedestal
23 Support element
24 Support wing
25 Support recess
26 Axial terminal wall
27 Support bore hole
28 Claw element
29 Side surface
30 Threaded bolt
31 Axial front wall
T Circumferential line of the first claw
S Circumferential line of the second claw

What is claimed is:

1. An elastic shaft coupling, comprising:
   a first shaft hub which supports first claws that are distributed over an outer circumference of the first shaft hub and offset from one another; and
   a second shaft hub which supports second claws that are distributed over an outer circumference of the second shaft hub and offset from one another,
   wherein the first shaft hub and the second shaft hub are offset from one another in an axial direction and separated from one another by a radial plane,
   wherein the first claws are mounted on the first shaft hub and extend in the axial direction so that they overlap with the second shaft hub and extend through the radial plane,
   wherein the second claws are mounted on the second shaft hub and extend in the axial direction so that they overlap with the first shaft hub and extend through the radial plane,
   wherein the first claws protrude into intermediary spaces between the second claws and the second claws protrude into intermediary spaces between the first claws,
   wherein elastic coupling elements are respectively arranged between adjacent first claws and second claws,
   wherein an outer circumferential surface of the first shaft hub is provided with mounting surfaces for the first claws and an outer circumferential surface of the second shaft hub is provided with mounting surfaces for the second claws,
   wherein the first claws and the second claws have contact surfaces which are shaped complementary to the mounting surfaces of the first shaft hub and the second shaft hub,
   wherein the first claws and the second claws have radially extending bores for receiving radially extending bolts for removably mounting the first claws on the first hub and the second claws on the second hub.

2. An elastic shaft coupling according to claim 1, wherein a cross-section of the first claw or of the second claw taken along a middle-plane of the claw has a substantially L-shaped configuration.

3. An elastic shaft coupling according to claim 1, wherein a cross-section of the first claw and of the second claw taken along a middle-plane of the claw has a substantially L-shaped configuration.

4. An elastic shaft coupling, comprising:
   a first shaft hub which supports first claws that are removably mounted on the first shaft hub and distributed over an outer circumference of the first shaft hub and offset from one another; and
   a second shaft hub which supports second claws that are removably mounted on the second shaft hub and distributed over an outer circumference of the second shaft hub and offset from one another,
   wherein the first shaft hub and the second shaft hub are offset from one another in an axial direction arid separated from one another by a radial plane,
   wherein the first claws are mounted on the first shaft hub and extend in the axial direction so that they overlap with the second shaft hub and extend through the radial plane,
   wherein the second claws are mounted on the second shaft hub and extend in the axial direction so that they overlap with the first shaft hub and extend through the radial plane,
   wherein the second shaft hub and the first shaft hub have an identical outer diameter and the second shaft hub and the first shaft hub are co-axially arranged,
   wherein the first claws mounted on the first shaft hub axially extend to overlap with the second shaft hub and the second claws mounted on the second shaft hub axially extend to overlap with the first shaft hub.
   wherein the first claws protrude into intermediary spaces between the second claws and the second claws protrude into intermediary spaces between the first claws,
   wherein elastic coupling elements are respectively arranged between adjacent first claws and second claws, so that one single separate elastic coupling element is arranged between each pair of a first claw and a second claw, and
   wherein the first claws and the second claws respectively include portions which radially overlap the one single separate elastic coupling element against a radial outward movement.

5. The elastic shaft coupling according to claim 4, wherein the claws include concave side faces, and wherein the elastic elements have a bi-convex cross section.

* * * * *